United States Patent [19]
Meester

[11] Patent Number: 5,865,675
[45] Date of Patent: Feb. 2, 1999

[54] BULK WEIGHING SYSTEM

[75] Inventor: David Jeffrey Meester, Fresno, Calif.

[73] Assignee: FMC Corporation, Chicago, Ill.

[21] Appl. No.: 808,098

[22] Filed: Feb. 28, 1997

[51] Int. Cl.⁶ .............................. A01D 61/00; A01D 90/10
[52] U.S. Cl. ........................ 460/114; 460/119; 460/123; 193/27; 414/21
[58] Field of Search ................................ 460/123, 6, 114, 460/119, 149, 150; 56/10.2 R, DIG. 15, 16.6; 193/27, 7, 3; 198/DIG. 959, 524; 414/21

[56] References Cited

U.S. PATENT DOCUMENTS

| | | | |
|---|---|---|---|
| 3,308,924 | 3/1967 | Hecox | 198/39 |
| 3,340,935 | 9/1967 | Csimma | 460/114 X |
| 3,497,084 | 2/1970 | Murrah | 414/21 |
| 4,231,439 | 11/1980 | Hall, Jr. et al. | 177/25 |
| 4,498,569 | 2/1985 | Tanaka et al. | 193/27 |
| 4,531,630 | 7/1985 | Oury et al. | 198/524 X |
| 5,088,569 | 2/1992 | Checcucci | 177/145 |
| 5,103,623 | 4/1992 | Herrett | 56/16.6 X |
| 5,318,475 | 6/1994 | Schrock et al. | 460/1 |

*Primary Examiner*—Terry Lee Melius
*Attorney, Agent, or Firm*—Speckman Pauley Petersen & Fejer

[57] ABSTRACT

The invention is a harvester which is able to weigh harvested fruit. The harvester transfers the fruit from the harvester by a transfer conveyor. The weighing system is a first shoe and a second shoe supported on the end of the transfer conveyor. A load cell supports the second shoe and is used to determine the weight of the fruit in the second shoe. A linkage system is used to keep the first shoe and second shoe in desired relative positions as the transfer conveyor is moved up or down.

14 Claims, 3 Drawing Sheets

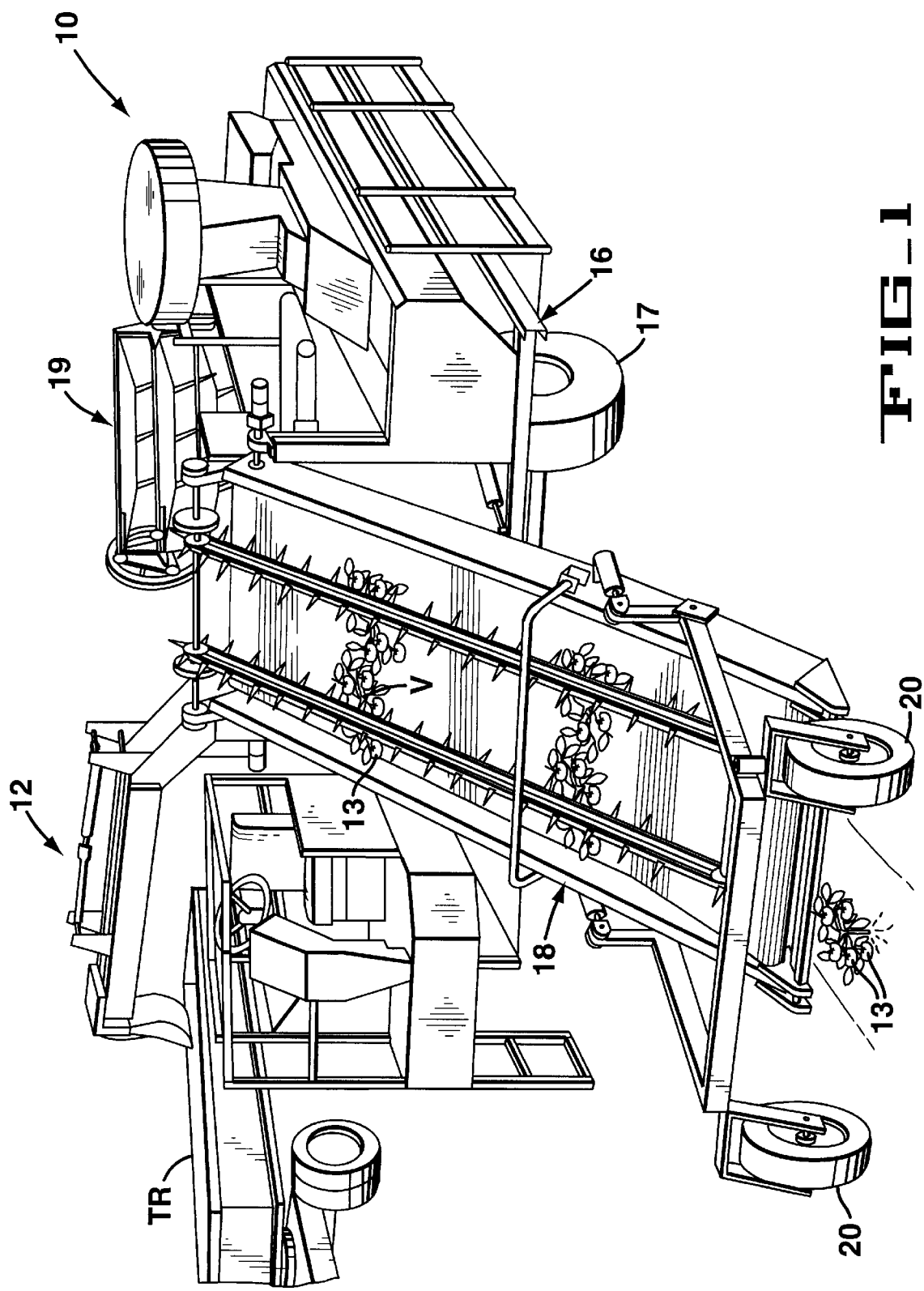
FIG_1

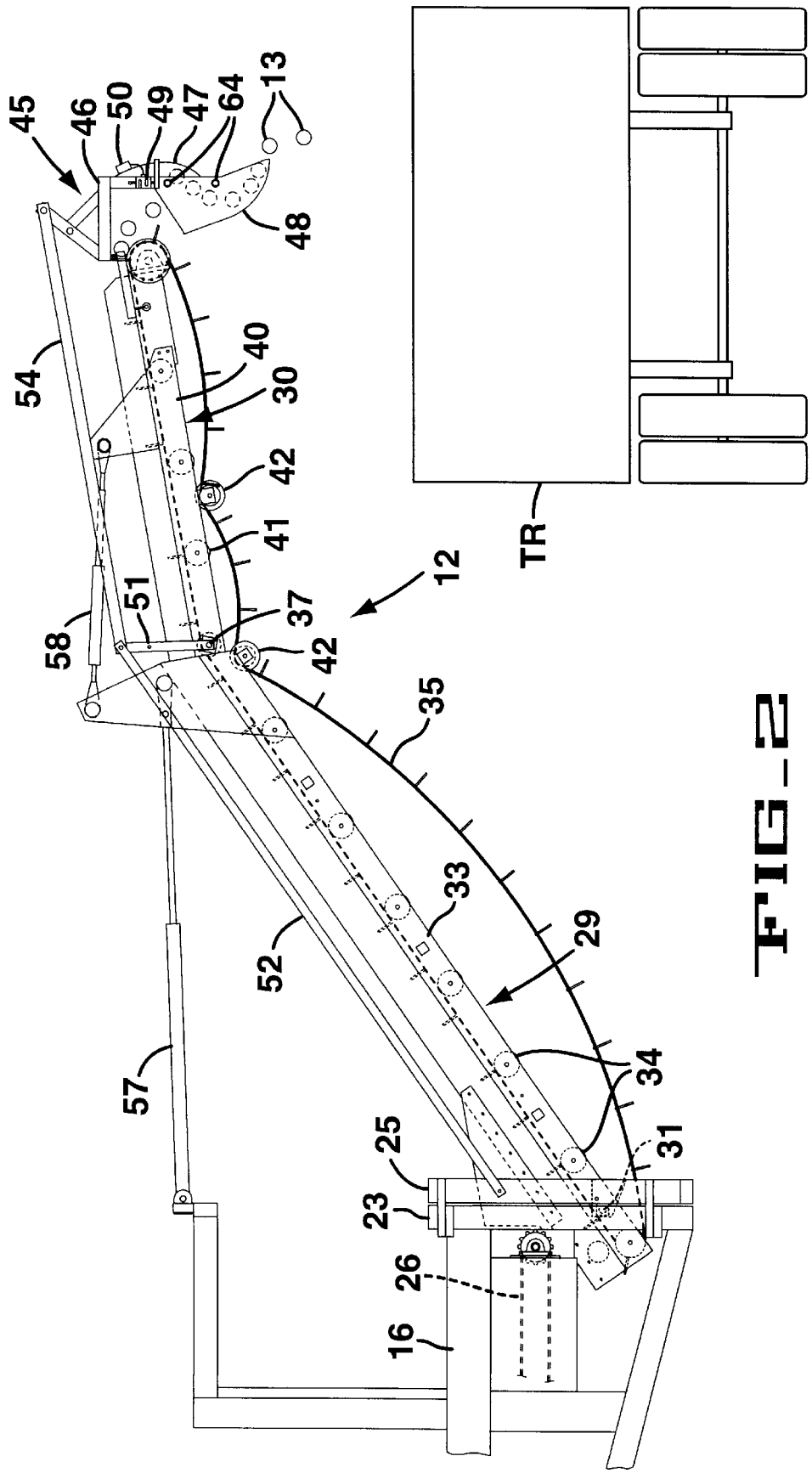
FIG_2

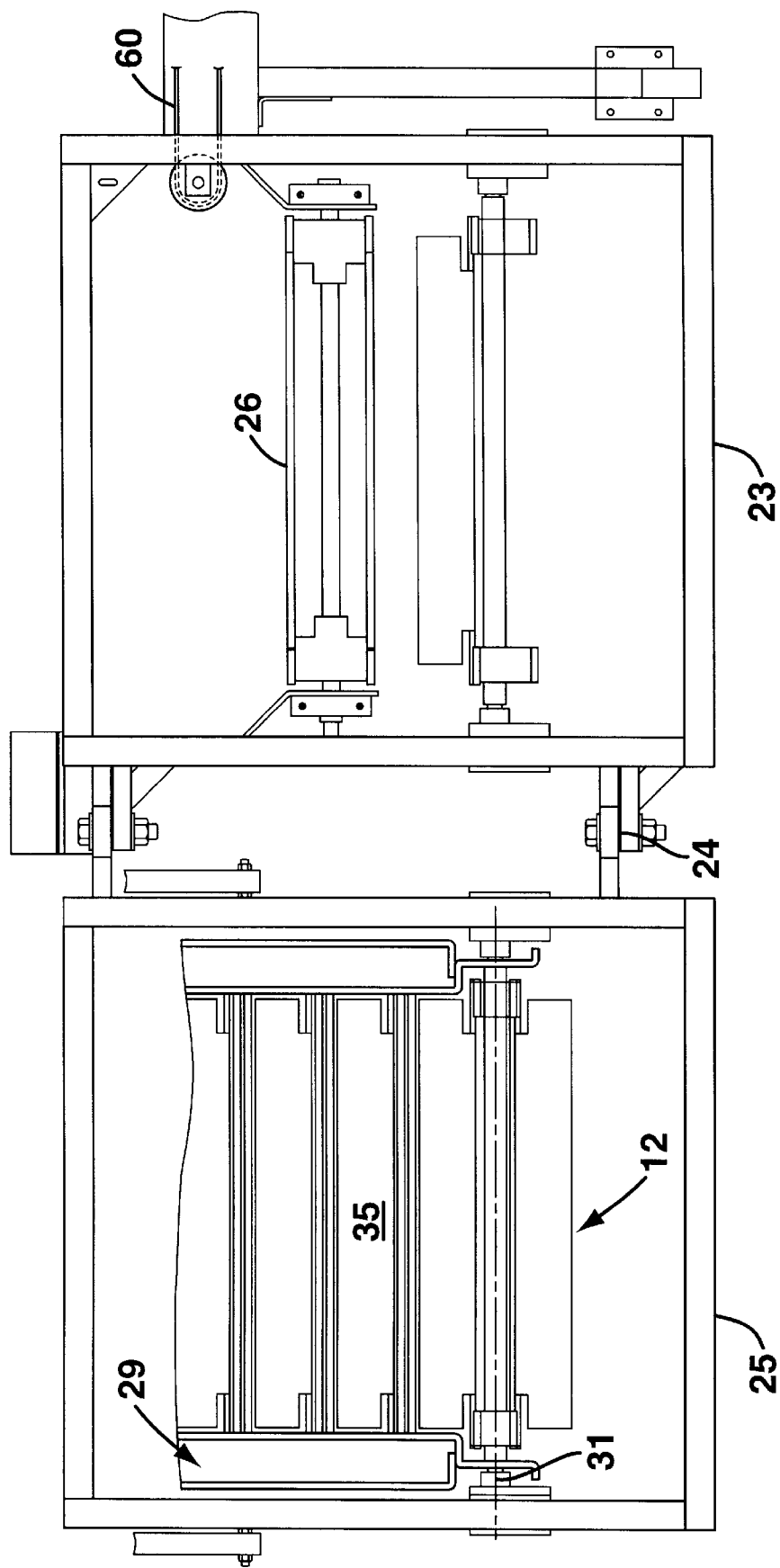
FIG_3

BULK WEIGHING SYSTEM

BACKGROUND OF THE INVENTION

In a harvester used for removing fruit, such as tomatoes, from plants, such as tomato vines, it is desirable to monitor the throughput of the fruit harvested. In some harvesters, a transfer conveyor is used to transfer the harvested fruit to a storage container. Some of these harvesters transfer by a transfer conveyor the fruit to a trailer, which moves with the harvester as the harvester is harvesting. In some harvesters it is desirable to have a movable transfer conveyor, which can transfer fruit at various angles and elevations.

SUMMARY OF THE INVENTION

It is an object of the invention to provide a method and apparatus which weighs fruit provided by a movable transfer conveyor at various angles and elevations.

The invention provides two shoes and a linkage system which are able to weigh fruit discharged from the movable transfer conveyor to a trailer.

BRIEF DESCRIPTION OF THE DRAWINGS

FIG. 1 is a perspective view of a preferred embodiment of the invention.

FIG. 2 is a side view of a transfer conveyor.

FIG. 3 is an enlarged view of a fixed frame joined to a swing frame.

DESCRIPTION OF THE PREFERRED EMBODIMENTS

FIG. 1 is a perspective view of a preferred embodiment of the invention, showing a harvester 10, with a trailer TR being pulled adjacent to the harvester 10. A transfer conveyor 12 transports harvested fruit 13 from the harvester 10 to the trailer TR.

The harvester 10 comprises a harvester frame 16, supported by wheels 17, a pick up mechanism 18, a separator mechanism 19, and the transport conveyor 12.

FIG. 2 is a side view of the right side of the transfer conveyor 12. A fixed frame 23 is supported by the harvester frame 16. FIG. 3 is an enlarged view of the fixed frame 23. The fixed frame 23 is connected by a frame hinge 24 to a swing frame 25. A cross conveyor 26 is connected to the fixed frame 23. The transfer conveyor 12 is supported by the swing frame 25. The transfer conveyor 12 comprises a lower section 29 and an upper section 30. The lower section 29, comprises a lower section frame 33 and a plurality of interior lower section rollers 34 supported by the lower section frame 33. A first end of the lower section frame 33 is connected to the swing frame 25 by a swing frame pivot 31 and extends to a position below the cross conveyor 26. This allows the lower section frame 33 to rotate with respect to the swing frame 25, thus making the lower section frame 33 rotatably connected to the swing frame 25. The lower section frame 33 extends from the swing frame pivot 31 to a transfer conveyor pivot 37. The upper section 30 comprises, an upper section frame 40 and a plurality of interior upper section rollers 41 supported by the upper section frame 40. The upper section frame 40 extends from the transfer conveyor pivot 37 at a first end of the upper section frame 40 to a second end of the upper section frame 40. An elevator belt 35 surrounds the plurality of interior lower section rollers 34 and the plurality of interior upper section rollers 41. The elevator belt 35 is further supported by a plurality of exterior rollers 42 extending from the first end of the lower section frame to the second end of the upper section frame.

A weighing apparatus 45 is rotatably supported by the second end of the upper section frame 40. The weighing apparatus 45 comprises a support frame 46, a first shoe 47, and a second shoe 48. The support frame 46 supports the first shoe 47 in a position adjacent to the second end of the upper section frame 40. A pair of load cells 49 are mechanically connected between the support frame 46 and the second shoe 48 and supports the second shoe 48 in a position below the first shoe 47. A plurality of pins 64 connected to the second shoe 48 fit in vertical slots in the frame 46 to allow the second shoe 48 to slide vertically with respect to the support frame 46 and prevent the second shoe 48 from twisting with respect to the support frame 46. In this embodiment, the load cells 49 are S shaped with a first load cell on the right side of the second shoe 48 and a second load cell on the left side of the second shoe 48. The load cells 49 are electrically connected to a weight calculator 50. The first shoe 47 is an object that provides a curved surface for directing the fruit. In the preferred embodiment, the curved surface of the first shoe 47 is concaved towards the upper section 30. The second shoe 48 is an object that provides a curved surface for directing the fruit. In the preferred embodiment, the curved surface of the second shoe 48 is concaved towards the first shoe 47.

A first right side four bar linkage is formed using the lower section frame 33. A right pivot arm 51 extends from the transfer conveyor pivot 37, with a first end of the pivot arm 51 rotatably connected to the transfer conveyor pivot 37. A right lower section linkage 52 extends from the swing frame 25 to a second end of the pivot arm 51. A first end of the right lower section linkage 52 is pivotally connected to the swing frame 25. A second end of the right lower section linkage 52 is pivotally connected to the second end of the right pivot arm 51.

A second right four bar linkage is formed using the upper section frame 40, the right pivot arm 51, the support frame 46, and a right upper section linkage 54. The right upper section linkage 54 extends from the right pivot arm 51 to the support frame 46, with a first end of the right upper section linkage 54 pivotally connected to the right pivot arm 51 and a second end of the right upper section linkage 54 pivotally connected to the support frame 46.

A left lower linkage and a left pivot arm are connected to the left side of the lower section frame 33 to form a first left side four bar linkage. A left upper section linkage is connected between the left pivot arm and the support frame 46 to form a second left side four bar linkage. The first and second left side four bar linkages are identical to the first and second right side four bar linkages and are placed to give even support on both right and left sides of the support frame 46.

A first hydraulic cylinder 57 extends from the harvester frame 16 to the lower section frame 33. A second hydraulic cylinder 58 extends from the lower section frame 33 to the upper section frame 40.

One or more fruit conveyors 60 extend to a position above the cross conveyor 26.

In operation, the harvester 10 is directed along a row of plants. The plants are severed and picked up on the pick mechanism 18. A separator mechanism 19 separates the fruit 13 such as tomatoes from the plants. The fruit conveyors 60 convey the separated fruit 13 from the separator mechanism 19 to the cross conveyor 26. The cross conveyor 26 passes the fruit 13 to a first end of the lower section 29 formed by the first end of the lower section frame 33. The fruit 13 passes from the cross conveyor 26 to the elevator belt 35, which moves the fruit 13 from the first end of the lower section frame 33 to the second end of the lower section frame 33. The elevator belt then moves the fruit from the second end of the lower section frame 33 to the first end of the upper section frame 40 and then to the second end of the upper section frame 40. The movement of the fruit 13 along the upper section provides a horizontal component of the velocity of the fruit 13 so that when the fruit leaves the elevator belt 35 at the second end of the upper section frame 40 the fruit 13 moves with a horizontal velocity component into the first shoe 47. The first shoe 47 directs the fruit 13 and allows the fruit 13 to drop into the second shoe 48 in a uniform manner. The dropping fruit applies a force to the second shoe 48 for a period of time, is deflected by the second shoe, and then drops into the trailer TR being pulled along side the harvester 10 by a tractor. Although the fruit 13 is deflected by the second shoe 48, the movement of the fruit is not stopped by the second shoe 48.

The load cells 49 measure the force of the fruit 13 on the second shoe 48 for the period of time. The increased force on the load cells 49 causes an increase in voltage applied to the weight calculator 50. The weight calculator 50 integrates the amplitude of the voltage received from the load cells 49 over time and multiplies that value by a calibration constant to determine the weight of the fruit 13. This calibration constant is based upon the profiles of the second shoe 48 and the uniform trajectory of the fruit 13 delivery.

It is important that the first shoe 47 be kept in the same position with respect to the second shoe 48. In addition, the second shoe must not freely swing as the fruit 13 applies forces to the second shoe 48. It is desirable that the transfer conveyor 12 be adjustable to be able to accommodate trailers TR of various heights, or to even be able to provide fruit 13 to ground level.

The first hydraulic cylinder 57 extends and contracts to raise and lower the lower section 29 by rotating the lower section 29 with respect to the harvester 10 about the swing frame pivot 31. The second hydraulic cylinder 58 extends and contracts to raise and lower the upper section 30 by rotating the upper section 30 with respect to the lower section 29 about the transfer conveyor pivot 37. The first and second hydraulic cylinders 57, 58 allow the transfer conveyor 12 to be raised and lowered to allow the delivery of fruit 13 at different heights and distances from the harvester 10.

The first and second right side four bar linkage and the first and second left side four bar linkage keep the first shoe 47 in the same relative position with respect to the swing frame 25 of the machine even as the angle of the lower section 29 and the angle of the upper section 30 changes.

In another embodiment of the invention, the pair of load cells 49 may be replaced by a single load cell. In another embodiment, the first and second hydraulic cylinders 57,58 may by replaced by other lifting mechanisms such as cables and motors or gears.

Since this weighing system is independent of the speed of the elevator belt, the speed of the elevator belt is not needed to determine the weight of the fruit. So roller positioning used in determining the speed of the elevator belt is not needed for determining weight. In addition, error from slippage causing an error in belt speed will not affect the accuracy of measurements. Since the weighing occurs just before the fruit is transferred to the trailer, the inventive apparatus weighs the true product after color sorting and other sorting has been performed. In addition, the deceleration by the first shoe helps to reduce damage to the fruit. By using two shoes, the length of the transfer conveyor 12 is reduced, thus reducing the cantilever weight. The use of two shoes also allows the fruit force on the second shoe to be kept more constant even though the trajectory of fruits into the first shoe varies.

The assumption of a time constant based upon geometry of the weighing apparatus, gravity, and uniform product flow is not always precise. For example, the firmness of the fruit 13 changes with temperature and fruit maturity, causing variance in the time the fruit applies a force to the second shoe. Such variance may be corrected through software techniques.

The right pivot arm 51, right lower section linkage 52, and right upper section linkage 54 work with the left pivot arm, left lower section linkage, and left upper section linkage to form a fixed angle device. In the specification and claims a fixed angle device is defined as a device that keeps the angle of the weighing apparatus at a fixed angle with respect to the harvester or ground, even as the transfer conveyor 12 changes angles with respect to the ground or the rest of the harvester and even when forces are being applied to the weighing apparatus by the fruit. Other fixed angle devices are possible, such as one or more hydraulic cylinders and a control device, so that as the transfer conveyor moves, the control device causes the hydraulic cylinders to extend or contract to keep the weighing apparatus at a fixed angle with respect to the harvester or ground. The control device may use a plumb bob to keep the weighing apparatus at a fixed angle with respect to the ground.

While preferred embodiments of the present invention have been shown and described herein, it will be appreciated that various changes and modifications may be made therein without departing from the spirit of the invention as defined by the scope of the appended claims.

What is claimed is:

1. An apparatus for harvesting and weighing fruit, comprising:
  a harvester, for separating fruit from plants;
  a transfer conveyor with a first end and a second end, wherein the first end of the transfer conveyor is mechanically connected to the harvester; and
  a weighing apparatus, comprising:
    a support frame mechanically connected to the second end of the transfer conveyor;
    a first shoe mechanically connected to the support frame;
    a load cell with a first end and a second end, wherein the first end of the load cell is mechanically connected to the support frame; and
    a second shoe mechanically connected to the second end of the load cell in a position below the first shoe, so that the first shoe may direct fruit and allow it to drop to the second shoe in a uniform manner to apply force to the second shoe for a period of time.

2. The apparatus, as recited in claim 1, wherein the weighing apparatus further comprises a weight calculator electrically connected to the load cell.

3. The apparatus, as recited in claim 2, further comprising a fixed angle device mechanically connected to the weighing apparatus.

4. The apparatus, as recited in claim 3, wherein the transfer conveyor, comprises:
  a lower section, with a first end and a second end, wherein the first end of the lower section is rotatably connected to the harvester, wherein the lower section comprises:

a lower section frame; and a plurality of lower section inner rollers supported by the lower section frame; and an endless belt surrounding the plurality of interior lower section rollers.

5. The apparatus, as recited in claim 4, further comprising a first lifting mechanism connected between the lower section frame and the harvester.

6. The apparatus, as recited in claim 5, wherein the transfer conveyor, further comprises:

an upper section, with a first end and a second end, wherein the first end of the upper section is rotatably connected to the second end of the lower section, wherein the upper section comprises:

an upper section frame; and a plurality of interior upper section rollers supported by the upper section frame.

7. The apparatus, as recited in claim 6, wherein the fixed angle device, comprises:

a lower section linkage, with a first end and a second end, wherein the first end of the lower section linkage is rotatably connected to the harvester;

a pivot arm rotatably connected to the transfer conveyor and the second end of the lower section linkage;

an upper section linkage, with a first end and a second end, wherein the first end of the upper section linkage is rotatably connected to the pivot arm, and wherein the second end of the upper section linkage is rotatably connected to the support frame, and wherein the endless belt surrounds the plurality of interior upper section rollers.

8. The apparatus, as recited in claim 7, further comprising a second lifting mechanism connected between the lower section frame and the upper section frame.

9. The apparatus, as recited in claim 8, further comprising a second load cell with a first end and a second end, wherein the first end of the second load cell is mechanically connected to the support frame and the second end of the second load cell is mechanically connected to the second shoe, and wherein the second load cell is electrically connected to the weight calculator.

10. The apparatus, as recited in claim 3, further comprising a second load cell with a first end and a second end, wherein the first end of the second load cell is mechanically connected to the support frame and the second end of the second load cell is mechanically connected to the second shoe, and wherein the second load cell is electrically connected to the weight calculator.

11. An apparatus for harvesting and weighing fruit, comprising:

a harvester, for separating fruit from plants;

a transfer conveyor with a first end and a second end, wherein the first end of the transfer conveyor is mechanically connected to the harvester with capability for moving at different angles relative to the harvester or a ground surface;

a weighing apparatus mechanically connected to the second end of the transfer conveyor; and a fixed angle device mechanically connected to the weighing apparatus, including apparatus for maintaining the weighing apparatus at a fixed angle relative to the harvester or a ground surface as the transfer conveyor changes angles relative to the harvester or a ground surface.

12. The apparatus, as recited in claim 11, further comprising a first lifting mechanism for changing an angle of the transfer conveyor.

13. The apparatus, as recited in claim 12, wherein the transfer conveyor, comprises:

a lower section, rotatably connected to the harvester, wherein the first lifting means is mechanically connected to the lower section; and an upper section, rotatably connected between the lower section and the weighing apparatus.

14. The apparatus, as recited in claim 13, further comprising a second lifting means mechanically connected to the upper section.

* * * * *